No. 836,193. PATENTED NOV. 20, 1906.
J. F. KOEPP.
LINE HOLDER.
APPLICATION FILED JUNE 13, 1905.

WITNESSES:
Frank W. Zillmer
Harry C. Walley

INVENTOR:
John F. Koepp.
by his attorney
W. E. Harrison

THE NORRIS PETERS CO., WASHINGTON, D. C.

UNITED STATES PATENT OFFICE.

JOHN F. KOEPP, OF PARNASSUS, PENNSYLVANIA, ASSIGNOR OF ONE-HALF TO FRANK W. ZILLMER, OF NEW KENSINGTON, PENNSYLVANIA.

LINE-HOLDER.

No. 836,193.

Specification of Letters Patent.

Patented Nov. 20, 1906

Application filed June 13, 1905. Serial No. 264,987.

*To all whom it may concern:*

Be it known that I, JOHN F. KOEPP, a citizen of the United States, residing at Parnassus, in the county of Westmoreland and State of Pennsylvania, have invented certain new and useful Improvements in Line-Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved line-holder; and it consists in a hook having eccentrically pivoted thereto a lever adapted to engage with and hold a line or rope rigidly within said hook and a means for locking or holding said eccentric lever to prevent accidental opening, together with the certain details of construction and combination of parts, as will be fully described hereinafter.

Figure 1:
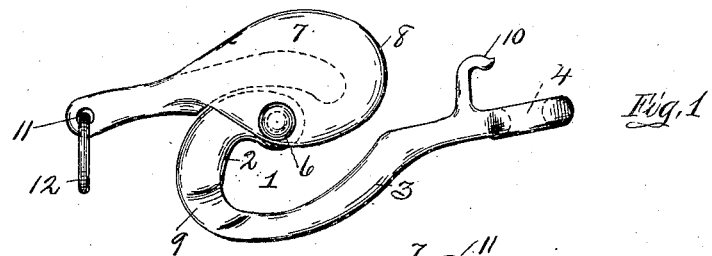
Figure 2:
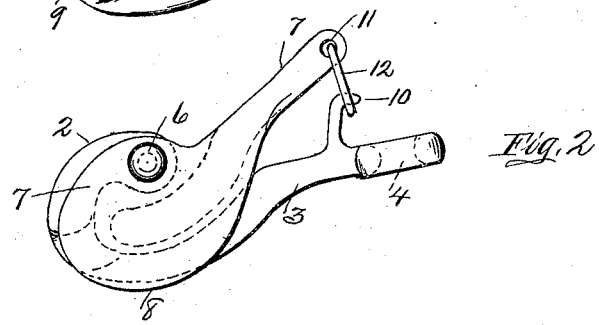
Figure 3:
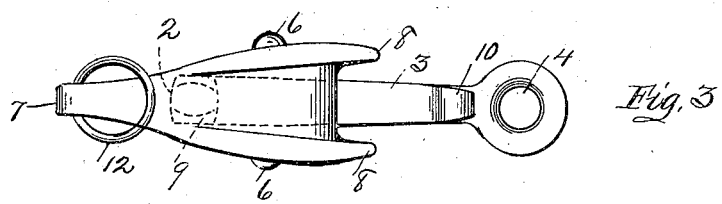
Figure 4:
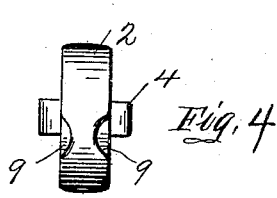
Figure 5:
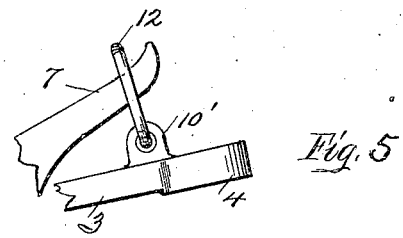

In the accompanying drawings, Figure 1 is a side elevation of my improved line-holder, showing the same open to receive the line, the said view being constructed and arranged in accordance with my invention. Fig. 2 is a similar view showing the position of the parts when closed to secure the line therein. Fig. 3 is a plan view of the holder when open. Fig. 4 is an end elevation of the hook detached from the eccentric lever. Fig. 5 is a side elevation of the ends of the lever and shank of the hook, showing a modified form of locking the two together.

To construct a line-holder in accordance with my invention, and thereby provide a device for holding clothes-lines, ropes, &c., I form from suitable material a hook consisting of an upwardly and inwardly bent portion 2, the shank 3, and integral eye 4, adapted to be engaged with a hook or other fixed object. Pivoted to the inner end of the bent portion 2 of the hook by means of a rivet is an eccentric lever 7, having outwardly-extending flanges 8, eccentric with said pivot. Said flanges are adapted to engage with the rope placed in the recess 1, formed by the bend of the hook, and when closed or in the position such as shown at Fig. 2 will inclose a portion of the shank 3 of the hook and prevent lateral strain on the parts. Formed at either side of the bent portion 2, forming the hook proper, are recesses or grooves 9, which serve to contain and protect the line from injury while being pressed by the flanges 8 of the lever 7. Formed on the shank 3 near the eye 4 and integral with said shank is an upwardly-extending hook 10, which, together with a ring 12, loosely attached in an orifice 11 at the outer end of the lever 7, affords a means whereby the said lever and shank 3 may be locked together, as will be seen by reference to Fig. 2 of the drawings. Another and modified form of this locking device is shown at Fig. 5 of the drawings, in which the locking ring or link 12 is attached to a small boss 10', formed on the shank 3 of the hook, and the said link engaging with the lever 7 by passing over the free end of the same.

In operation the above device will be found particularly useful as a holder for clotheslines, the said line being arranged in the recess 1 and drawn taut and the eccentric lever 7 moved about its pivot 6 to the position shown at Fig. 2 of the drawings and locked in such position by engaging the link 12 with the hook 10. The flanges 8 clamp the rope tightly in the recesses 9 by forming a sharp bend in said rope and by the frictional contact of the parts. The rope may be released by moving the clamp to the position shown at Fig. 1 and the said rope passed between the shank 3 and flanges 8.

Having thus described my invention, what I claim, and desire to secure by Letters Patent, is—

1. The herein-described line-holder comprising a hook having an eye at one end for connection with a stationary or fixed object and formed with an opening at the inner end or point, an eccentric clamp member journaled to the point of said hook by a transverse rivet, said clamp member having a lever portion 7 and integral eccentric flanges adapted to embrace and engage the sides of the hook and support the point of the same, thereby locking said clamp member against lateral movement, said hook having recesses 9 at each side, and a means for locking the lever portion of the clamp member to the shank of the hook, whereby said clamp member is held in such position as to maintain its frictional hold upon the line, as and for the purpose described.

2. The herein-described line-holder comprising a hook having an eye at one end and formed with an opening at the inner end or point, an eccentric clamp member journaled to the point of said hook by a transverse rivet, said clamp member having a lever portion 7 and integral eccentric flanges 8 adapted to engage and embrace the sides of the hook and support the point of the same, thereby locking said clamp member against lateral movement, said hook having recesses 9 at each side, a small hook 10 formed integral with the shank 3, and a link 12 loosely connected to the lever 7, said link adapted to engage with said hook, whereby pressure is maintained against the rope, substantially as and for the purpose described.

In testimony whereof I affix my signature in presence of two witnesses.

JOHN F. KOEPP.

Witnesses:
FRANK W. ZILLMER,
HARRY A. WALLEY.